United States Patent
Kakihara et al.

(10) Patent No.: US 9,300,234 B2
(45) Date of Patent: Mar. 29, 2016

(54) ROTARY ELECTRIC MACHINE CONTROLLER, ROTARY ELECTRIC MACHINE CONTROL METHOD, AND METHOD OF CREATING CONTROL MAP

(71) Applicant: Kabushiki Kaisha Yaskawa Denki, Kitakyushu-shi (JP)

(72) Inventors: Masanobu Kakihara, Kitakyushu (JP); Shinya Morimoto, Kitakyushu (JP)

(73) Assignee: KABUSHIKI KAISHA YASKAWA DENKI, Kitaktushu-Shi (JP)

( * ) Notice: Subject to any disclaimer, the term of this patent is extended or adjusted under 35 U.S.C. 154(b) by 9 days.

(21) Appl. No.: 14/261,402

(22) Filed: Apr. 24, 2014

(65) Prior Publication Data

US 2015/0207446 A1 Jul. 23, 2015

(30) Foreign Application Priority Data

Jan. 17, 2014 (JP) .................................. 2014-006548

(51) Int. Cl.
*H02P 1/04* (2006.01)
*H02P 6/18* (2006.01)
(Continued)

(52) U.S. Cl.
CPC ............ *H02P 6/183* (2013.01); *H02P 21/0039* (2013.01); *H02P 21/146* (2013.01)

(58) Field of Classification Search
CPC ....... H02P 21/146; H02P 6/183; H02P 6/185; H02P 21/0039; H02P 6/18; H02P 21/14; H02P 2203/11; H02P 25/023; H02P 21/0042; H02P 21/06; H02P 21/0035; H02P 21/0053; H02P 21/04; H02P 6/002

USPC ............ 318/400.02, 400.33, 400.13, 400.14, 318/806
See application file for complete search history.

(56) References Cited

U.S. PATENT DOCUMENTS 5,929,578 A * 7/1999 Atarashi ........................ 318/430
6,069,467 A * 5/2000 Jansen ........................... 318/802
(Continued)

FOREIGN PATENT DOCUMENTS

EP 1653599 A2 * 5/2006 ................ H02P 6/18
EP 1653599 A3 * 3/2009
(Continued)

OTHER PUBLICATIONS

The translation of Notice of Preliminary Rejection for corresponding Korean Patent Application No. 10-2014-0059490 dated Mar. 25, 2015.
(Continued)

*Primary Examiner* — Paul Ip
(74) *Attorney, Agent, or Firm* — Hubbs, Enatsky & Inoue PLLC

(57) ABSTRACT

A rotary electric machine controller according to the present application includes: a superimposer for superimposing a high-frequency signal on one of a voltage and a current of a motor having saliency; an estimator for calculating an estimate value of a magnetic-pole position of a rotor included in the rotary electric machine based on a high-frequency component appearing in the other one of the voltage and the current of the rotary electric machine; a retainer for retaining information relating to a correction amount corresponding to the estimate value of the magnetic-pole position of the rotor; and a corrector for correcting the estimate value of the magnetic-pole position of the rotor based on the information relating to the correction amount.

10 Claims, 7 Drawing Sheets

(51) Int. Cl.
*H02P 21/00* (2006.01)
*H02P 21/14* (2006.01)

(56) References Cited

U.S. PATENT DOCUMENTS

| | | | |
|---|---|---|---|
| 6,194,865 B1* | 2/2001 | Mitsui et al. | 318/811 |
| 6,329,781 B1* | 12/2001 | Matsui et al. | 318/717 |
| 6,462,491 B1 | 10/2002 | Iijima et al. | |
| 6,583,593 B2* | 6/2003 | Iijima et al. | 318/400.32 |
| 6,700,400 B2* | 3/2004 | Atarashi | 318/400.01 |
| 6,707,265 B2* | 3/2004 | Imai et al. | 318/400.32 |
| 6,713,981 B2* | 3/2004 | Nakajima | 318/491 |
| 7,045,988 B2* | 5/2006 | Ha et al. | 318/807 |
| 7,071,651 B2* | 7/2006 | Toyozawa et al. | 318/807 |
| 7,084,591 B2* | 8/2006 | Kobayashi et al. | 318/400.02 |
| 7,245,104 B2* | 7/2007 | Tomigashi et al. | 318/705 |
| 7,352,151 B2* | 4/2008 | Fujitsuna et al. | 318/721 |
| 7,443,130 B2* | 10/2008 | Takao et al. | 318/806 |
| 7,482,777 B2* | 1/2009 | Tomigashi | 318/807 |
| 7,932,692 B2* | 4/2011 | Inokuma | 318/799 |
| 8,084,976 B2* | 12/2011 | Hashimoto | 318/432 |
| 8,154,231 B2* | 4/2012 | Komatsu et al. | 318/400.06 |
| 8,159,168 B2* | 4/2012 | Liu et al. | 318/400.33 |
| 8,174,220 B2* | 5/2012 | Inoue et al. | 318/400.02 |
| 8,314,579 B2* | 11/2012 | Nishimura et al. | 318/400.32 |
| 8,350,507 B2* | 1/2013 | Ito et al. | 318/400.13 |
| 2002/0011814 A1* | 1/2002 | Nakajima | 318/491 |
| 2002/0113615 A1* | 8/2002 | Atarashi | 324/772 |
| 2002/0149335 A1* | 10/2002 | Imai et al. | 318/494 |
| 2003/0006723 A1* | 1/2003 | Sul et al. | 318/127 |
| 2004/0070360 A1* | 4/2004 | Schulz et al. | 318/700 |
| 2004/0070362 A1* | 4/2004 | Patel et al. | 318/701 |
| 2005/0110452 A1* | 5/2005 | Toyozawa et al. | 318/807 |
| 2005/0146306 A1* | 7/2005 | Ha et al. | 318/807 |
| 2005/0253540 A1* | 11/2005 | Kobayashi et al. | 318/254 |
| 2007/0040528 A1* | 2/2007 | Tomigashi et al. | 318/650 |
| 2007/0085508 A1* | 4/2007 | Fujitsuna et al. | 318/712 |
| 2007/0132424 A1* | 6/2007 | Takao et al. | 318/806 |
| 2007/0229021 A1* | 10/2007 | Yoshida et al. | 318/807 |
| 2008/0111516 A1* | 5/2008 | Inokuma | 318/799 |
| 2008/0197799 A1* | 8/2008 | Tomigashi | 318/768 |
| 2009/0190903 A1* | 7/2009 | Komatsu et al. | 388/803 |
| 2010/0156330 A1* | 6/2010 | Inoue et al. | 318/400.02 |
| 2010/0156334 A1* | 6/2010 | Nishimura et al. | 318/400.33 |
| 2010/0194319 A1* | 8/2010 | Ito et al. | 318/400.13 |
| 2010/0301790 A1* | 12/2010 | Liu et al. | 318/400.33 |
| 2011/0199031 A1 | 8/2011 | Balazovic et al. | |
| 2011/0241583 A1* | 10/2011 | He et al. | 318/400.09 |
| 2013/0049653 A1* | 2/2013 | Katou et al. | 318/400.02 |
| 2013/0073252 A1* | 3/2013 | Yamasaki et al. | 702/150 |
| 2013/0141023 A1* | 6/2013 | Sugita et al. | 318/400.02 |
| 2014/0049202 A1* | 2/2014 | Fukumaru et al. | 318/400.32 |
| 2014/0145654 A1* | 5/2014 | Zhang et al. | 318/400.02 |
| 2014/0145660 A1* | 5/2014 | Shimada et al. | 318/400.33 |
| 2014/0346984 A1* | 11/2014 | Shiota et al. | 318/400.02 |

FOREIGN PATENT DOCUMENTS

| | | |
|---|---|---|
| EP | 2698916 A2 * | 2/2014 |
| JP | 2000-350489 A | 12/2000 |
| JP | 2006-109589 A | 4/2006 |
| JP | 2010-213437 A | 9/2010 |
| JP | 2010-259255 A | 11/2010 |
| JP | 2013-090552 A | 5/2013 |

OTHER PUBLICATIONS

Yi Li et al: "Improved Rotor-Position Estimation by Signal Injection in Brushless AC Motors, Accounting for Cross-Coupling Magnetic Saturation", IEEE Transactions on Industry Applications, IEEE Service Center, Piscataway, NJ, US, vol. 45, No. 5, Sep. 1, 2009, pp. 1843-1850, XP011270477.

Zhu Z Q et al: "Compensation for Rotor Position Estimation Error due to Cross-Coupling Magnetic Saturation in Signal Injection Based Sensorless Control of PM Brushless AC Motors", Electric Machines &Drives Conference, 2007. IEMDC '07. IEEE International, IEEE, Piscataway, NJ, USA, May 1, 2007, pp. 208-213, XP031114836.

The Office Action dated Feb. 9, 2016 for corresponding JP application No. 2014-006548 and partial translation thereof.

* cited by examiner

(12)  United States Patent

ROTARY ELECTRIC MACHINE CONTROLLER, ROTARY ELECTRIC MACHINE CONTROL METHOD, AND METHOD OF CREATING CONTROL MAP

INCORPORATION BY REFERENCE

The present disclosure contains subject matter related to that disclosed in Japanese Priority Patent Application JP2014-006548 filed in the Japan Patent Office on Jan. 17, 2014, the entire contents of which are hereby incorporated by reference.

BACKGROUND OF THE INVENTION

1. Field of the Invention

The present application relates to a rotary electric machine controller, a rotary electric machine control method, and a method of creating a control map.

2. Description of the Related Art

In Japanese Patent Application Laid-open No. 2013-090552, the following rotary electric machine controller is disclosed. The rotary electric machine controller applies a high-frequency current to a rotary electric machine including a rotor having saliency and estimates a magnetic-pole direction of the rotor based on a high-frequency component contained in a voltage command as a component in response to the high-frequency current. The rotary electric machine controller calculates an error of an estimate value of the magnetic-pole direction, which is generated due to a d-q axis magnetic flux interference.

The inventors of the present application have found that the error of the estimate value of the magnetic-pole direction, which is generated due to the d-q axis magnetic flux interference, is not only a steady error as described in Japanese Patent Application Laid-open No. 2013-090552 but may also be generated depending on a magnetic-pole position of the rotor.

The present application has been made to solve the problem described above, and has an object to provide a rotary electric machine controller, a rotary electric machine control method, and a method of creating a control map, which are capable of suppressing an error of an estimate value corresponding to a magnetic-pole position of a rotor.

SUMMARY OF THE INVENTION

In order to solve the above-mentioned problem, according to one embodiment of the present application, there is provided a rotary electric machine controller including: a superimposer for superimposing a high-frequency signal on one of a voltage and a current of a rotary electric machine having saliency; an estimator for calculating an estimate value of a magnetic-pole position of a rotor included in the rotary electric machine based on a high-frequency component appearing in the other one of the voltage and the current of the rotary electric machine; a retainer for retaining information relating to a correction amount corresponding to the magnetic-pole position of the rotor; and a corrector for correcting the estimate value of the magnetic-pole position of the rotor based on the information relating to the correction amount.

Further, according to one embodiment of the present application, there is provided a rotary electric machine control method including: superimposing a high-frequency signal on one of a voltage and a current of a rotary electric machine having saliency; calculating an estimate value of a magnetic-pole position of a rotor included in the rotary electric machine based on a high-frequency component appearing in the other one of the voltage and the current of the rotary electric machine; retaining information relating to a correction amount corresponding to the magnetic-pole position of the rotor; and correcting the estimate value of the magnetic-pole position of the rotor based on the information relating to the correction amount.

Further, according to one embodiment of the present application, there is provided a method of creating a control map to be retained in a rotary electric machine controller, the method including: generating, for each of at least two points of a magnetic-pole position of a rotor included in a rotary electric machine having saliency, information relating to a correction amount for correcting an estimate value of the magnetic-pole position of the rotor, the correction amount being calculated based on a high-frequency component appearing in one of a voltage and a current of the rotary electric machine when a high-frequency signal is superimposed on the other one of the voltage and the current, the correction amount corresponding to the magnetic-pole position of the rotor; and associating, on the control map, the points of the magnetic-pole position of the rotor and the information relating to the correction amount generated for each of the points with each other.

DESCRIPTION OF THE EMBODIMENTS

Figure 1:
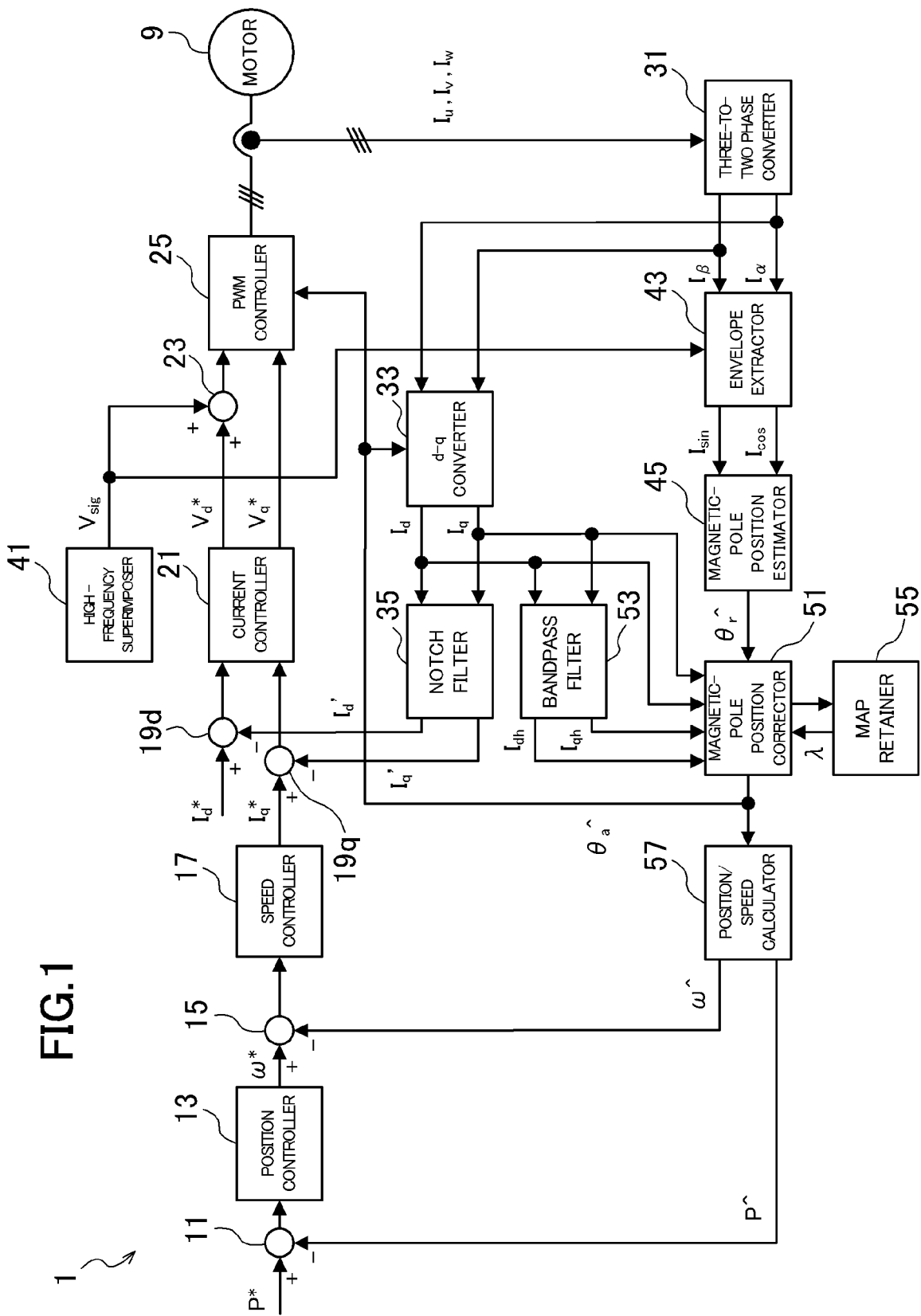
FIG. 1 is a diagram illustrating a configuration example of a motor controller according to an embodiment of the present application.

An embodiment of the present application is described referring to the drawings.

FIG. 1 is a diagram illustrating a configuration example of a motor controller 1 according to an embodiment of the present application. The motor controller 1 is an example of a rotary electric machine controller. Each of blocks included in the motor controller 1 is realized by, for example, a microprocessor executing information processing in accordance with a program stored in a memory.

A motor 9 to be controlled by the motor controller 1 is an example of a rotary electric machine, and is, for example, a synchronous motor. The motor 9 is a sensorless motor without a detector for detecting a position of a rotor. The motor controller 1 uses saliency of the motor 9 to estimate a magnetic-pole position of the rotor.

The motor controller 1 includes a subtractor 11, a position controller 13, a subtractor 15, a speed controller 17, subtractors 19$d$ and 19$q$, a current controller 21, an adder 23, a PWM controller 25, a three-to-two phase converter 31, a d-q converter 33, and a notch filter 35 as blocks for controlling the rotation of the motor 9.

Further, the motor controller 1 includes a high-frequency superimposer 41, an envelope extractor 43, a magnetic-pole position estimator 45, a magnetic-pole position corrector 51, a bandpass filter 53, a map retainer 55, and a position/speed calculator 57 as blocks for estimating a magnetic-pole position of the rotor of the motor 9.

The subtractor 11 calculates a differential value between a position command value P* output from, for example, a high-order system (not shown) and a position estimate value P^ output from the position/speed calculator 57, and then outputs the calculated differential value to the position controller 13.

The position controller 13 calculates a speed command value ω* for suppressing the differential value output from the subtractor 11, and then outputs the calculated speed command value ω* to the subtractor 15.

The subtractor 15 calculates a differential value between the speed command value ω* output from the position controller 13 and a speed estimate value ω^ output from the position/speed calculator 57, and then outputs the calculated differential value to the speed controller 17.

The speed controller 17 calculates a q-axis current command value $I_q$* for suppressing the differential value output from the subtractor 15, and then outputs the calculated q-axis current command value $I_q$* to the subtractor 19$q$.

The subtractor 19$d$ calculates a differential value between a d-axis current command value $I_d$* output from, for example, a high-order system and a d-axis current detection value $I_d$' output from the notch filter 35, and then outputs the calculated differential value to the current controller 21.

The subtractor 19$q$ calculates a differential value between the q-axis current command value $I_q$* output from the speed controller 17 and a q-axis current detection value $I_q$' output from the notch filter 35, and then outputs the calculated differential value to the current controller 21.

The current controller 21 calculates a d-axis voltage command value $V_d$* and a q-axis voltage command value $V_q$* for suppressing the differential values respectively output from the subtractors 19$d$ and 19$q$. Then, the current controller 21 outputs the d-axis voltage command value $V_d$* to the adder 23 and the q-axis voltage command value $V_q$* to the PWM controller 25.

The adder 23 adds the d-axis voltage command value $V_d$* output from the current controller 21 to a high-frequency signal $V_{sig}$ output from the high-frequency superimposer 41, and then outputs a d-axis voltage total value obtained by the addition to the PWM controller 25.

The PWM controller 25 generates a PWM signal for driving the motor 9 based on the d-axis voltage total value output from the adder 23 and the q-axis voltage command value $V_q$* output from the current controller 21, and then outputs the thus generated PWM signal to the motor 9. When generating the PWM signal, the PWM controller 25 uses a correction value $\theta_a$^ of the magnetic-pole position (magnetic-pole phase) output from the magnetic-pole position corrector 51.

The three-to-two phase converter 31 converts current detection values $I_u$, $I_v$, and $I_w$ of three-phase currents flowing through the motor 9 into current detection values $I_\alpha$ and $I_\beta$ of a fixed α-β coordinate system, and then outputs the thus obtained current detection values $I_\alpha$ and $I_\beta$ to the d-q converter 33 and the envelope extractor 43. In the fixed α-β coordinate system, the α-axis and the β-axis are orthogonal to each other, and the α-axis is fixed in a direction of a U-phase, for example.

The d-q converter 33 converts the current detection values $I_\alpha$ and $I_\beta$ of the fixed α-β coordinate system, which are output from the three-to-two phase converter 31, into current detection values $I_d$ and $I_q$ of a rotating d-q coordinate system, and then outputs the thus obtained current detection values $I_d$ and $I_q$ to the notch filter 35, the magnetic-pole position corrector 51, and the bandpass filter 53. When performing the d-q conversion, the d-q converter 33 uses the correction value $\theta_a$^ of the magnetic-pole position output from the magnetic-pole position corrector 51.

In the rotating d-q coordinate system, the d-axis is a magnetic-pole direction of the rotor of the motor 9, and the q-axis is an axis orthogonal to the d-axis. The d-axis current $I_d$ is also called "field current", whereas the q-axis current $I_q$ is also called "torque current". The details of the rotating d-q coordinate system are described later.

The notch filter (band-stop filter) 35 suppresses high-frequency components of the current detection values $I_d$ and $I_q$ output from the d-q converter 33, and then outputs the current detection values $I_d$' and $I_q$' whose high-frequency components are suppressed to the subtractors 19$d$ and 19$q$.

Now, the blocks for estimating the magnetic-pole position of the rotor of the motor 9 are described.

The high-frequency superimposer 41 is an example of a superimposer. The high-frequency superimposer 41 outputs the high-frequency signal $V_{sig}$ to the adder 23 so as to superimpose a high-frequency signal on the d-axis voltage command value $V_d$* output from the current controller 21. A frequency of the high-frequency signal $V_{sig}$ is sufficiently higher than a fundamental frequency of the voltage applied to the motor 9.

The mode of superimposition is not limited to superimposing the high-frequency signal only on the d-axis voltage command value $V_d$*. The high-frequency signal may be superimposed on the q-axis voltage command value $V_q$*, and may also be superimposed on both the d-axis voltage command value $V_d$* and the q-axis voltage command value $V_q$*.

Alternatively, the high-frequency signal may be superimposed on one or both of the d-axis current command value $I_d$* and the q-axis current command value $I_q$*. In this case, the magnetic-pole position can be estimated by using a response component which appears in the voltage applied to the motor 9.

The envelope extractor 43 extracts envelopes of the current detection values $I_\alpha$ and $I_\beta$ output from the three-to-two phase converter 31 based on the high-frequency signal $V_{sig}$ output from the high-frequency superimposer 41, and then outputs envelope detection values $I_{sin}$ and $I_{cos}$ to the magnetic-pole position estimator 45.

The magnetic-pole position estimator 45 is an example of an estimator. The magnetic-pole position estimator 45 calculates an estimate value $\theta_r$^ of the magnetic-pole position based on the envelope detection values $I_{sin}$ and $I_{cos}$ output from the envelope extractor 43, and then outputs the thus calculated estimate value $\theta_r$^ to the magnetic-pole position corrector 51.

A method of calculating the estimate value $\theta_r$^ of the magnetic-pole position is not limited to the above-mentioned mode in which the high-frequency signal is superimposed on the d-axis voltage command value and the envelopes are extracted. For example, there is a method of estimating the magnetic-pole position based on a parallel component and an orthogonal component of the motor current in response to an alternating voltage (or alternating current) applied to the motor. Also, there is a method of estimating the magnetic-pole position at a low speed including that in a stopped state by using a carrier frequency component. Further, there is a method of estimating the magnetic-pole position by detecting the motor current while changing an application voltage in each predetermined cycle of a carrier wave and obtaining a vector of the amount of change in current for each predetermined cycle. A method of calculating the estimate value $\hat{\theta}_r$ of the magnetic-pole position is publicly known, and therefore the detailed description thereof is herein omitted.

Figure 2:
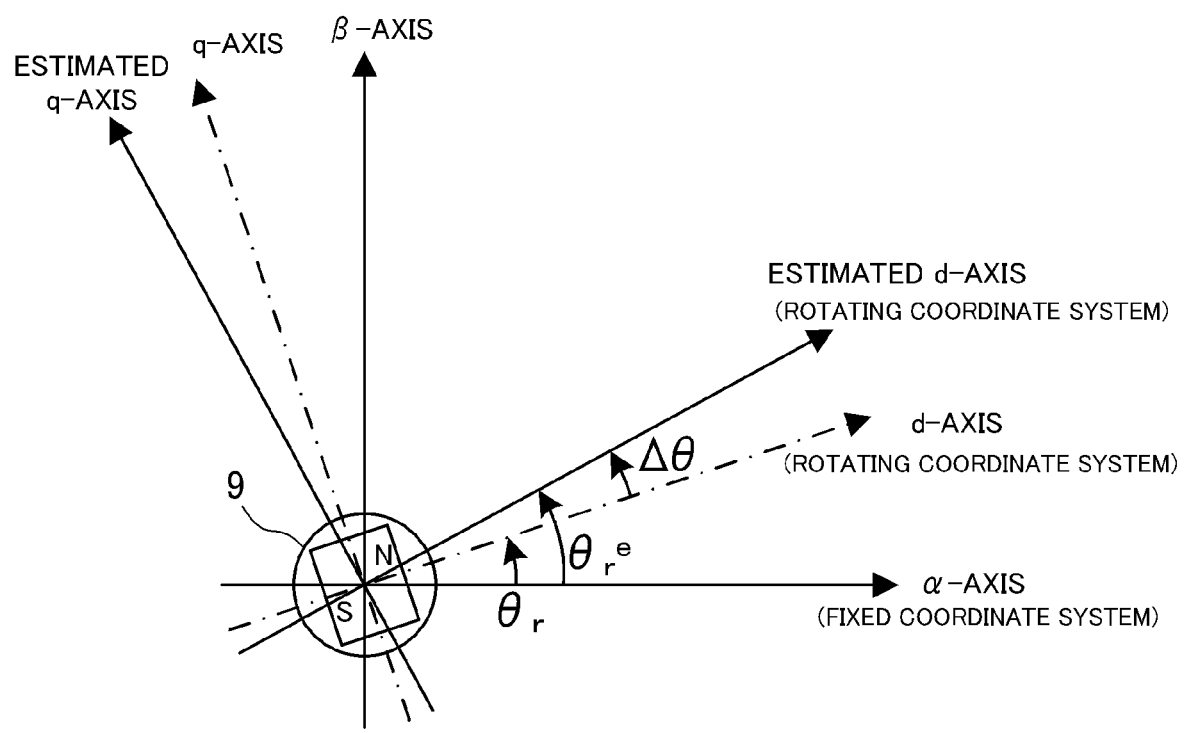
FIG. 2 is a graph showing a coordinate system.

The rotating d-q coordinate system estimated by the magnetic-pole position estimator 45 is now described referring to FIG. 2. The magnetic-pole position estimator 45 calculates the estimate value $\hat{\theta}_r$ of the magnetic-pole position, and thereby an estimated d-axis and an estimated q-axis are defined. The estimate value $\hat{\theta}_r$ of the magnetic-pole position is given as, for example, an angle between the estimated d-axis and the α-axis. A symbol $\theta_r^e$ shown in FIG. 2 denotes the estimate value $\hat{\theta}_r$ of the magnetic-pole position (both "e" and "^" indicate that it is an estimate value).

However, the estimated d-axis and the estimated q-axis defined by the magnetic-pole position estimator 45 may be shifted from actual d-axis and q-axis of the motor 9 in some cases. A symbol $\theta_r$ shown in FIG. 2 indicates an actual magnetic-pole position given as the angle between the actual d-axis and the α-axis. A symbol Δθ shown in FIG. 2 indicates an error (axial shift) between the estimated d-axis and the actual d-axis. Such an error Δθ is generated by d-q axis magnetic flux interference.

In Japanese Patent Application Laid-open No. 2013-090552, it is described that a steady error generated in accordance with a magnitude of the current flowing through the motor is corrected.

The inventors of the present application have found that the error Δθ of the estimate value $\hat{\theta}_r$ of the magnetic-pole position contains not only the steady component as described in Japanese Patent Application Laid-open No. 2013-090552 but also a component depending on the magnetic-pole position of the rotor.

Therefore, in this embodiment, the error Δθ contained in the estimate value $\hat{\theta}_r$ of the magnetic-pole position is suppressed by the operation of the magnetic-pole position corrector 51 described below.

Returning to the description referring to FIG. 1, the magnetic-pole position corrector 51 is an example of a corrector. Based on a control map retained by the map retainer 55, the magnetic-pole position corrector 51 corrects the estimate value $\hat{\theta}_r$ of the magnetic-pole position, which is output from the magnetic-pole position estimator 45, and then outputs a correction value $\hat{\theta}_a$ of the magnetic-pole position obtained by the correction to the position/speed calculator 57. The details of the magnetic-pole position corrector 51 are described later.

The bandpass filter 53 allows the high-frequency components of the d-axis current $I_d$ and the q-axis current $I_q$ output from the d-q converter 33 to pass therethrough and suppresses the other frequency components. Specifically, the bandpass filter 53 outputs a high-frequency component of the d-axis current $I_d$ (d-axis current high-frequency component $I_{dh}$) and a high-frequency component of the q-axis current $I_q$ (q-axis current high-frequency component $I_{qh}$) to the magnetic-pole position corrector 51.

The map retainer 55 is an example of a retainer. The map retainer 55 retains the control map for correcting the estimate value $\hat{\theta}_r$ of the magnetic-pole position, and returns a parameter λ relating to a correction amount in response to a request from the magnetic-pole position corrector 51 to the magnetic-pole position corrector 51. The details of the control map are described later.

The position/speed calculator 57 calculates the position estimate value $\hat{P}$ and the speed estimate value $\hat{\omega}$ based on the correction value $\hat{\theta}_a$ of the magnetic-pole position, which is output from the magnetic-pole position corrector 51. Then, the position/speed calculator 57 outputs the position estimate value $\hat{P}$ to the subtractor 11 and the speed estimate value $\hat{\omega}$ to the subtractor 15.

Figure 3:
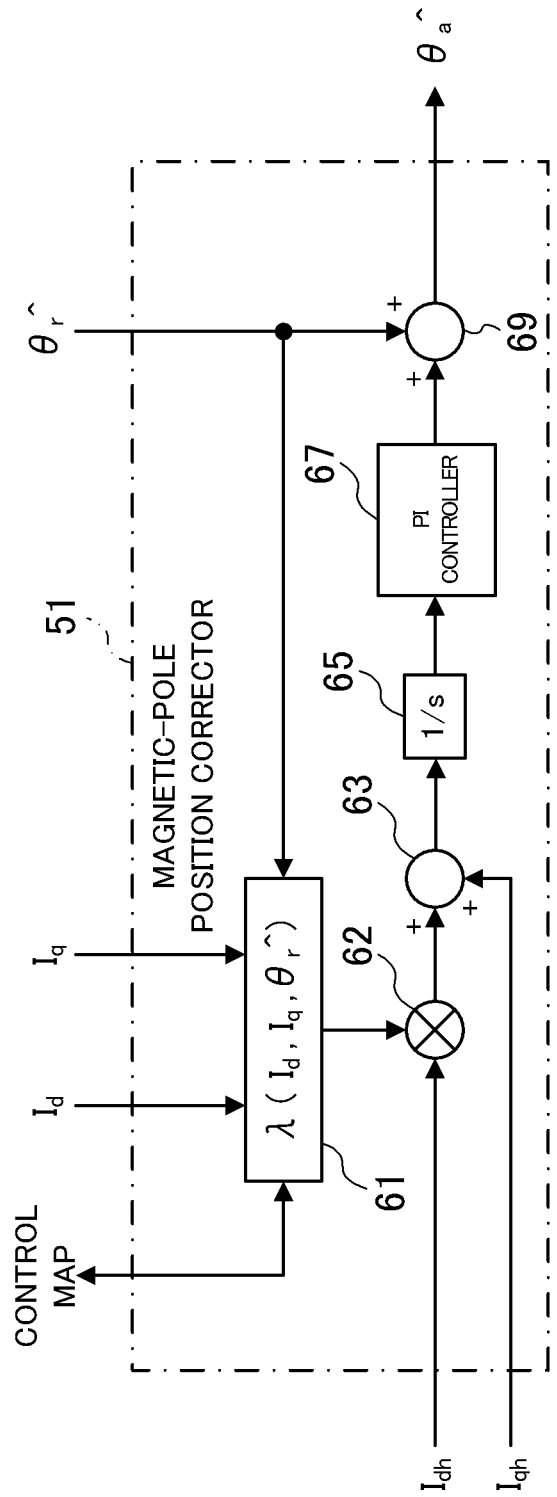
FIG. 3 is a diagram illustrating a configuration example of a magnetic-pole position corrector.

FIG. 3 is a diagram illustrating a configuration example of the magnetic-pole position corrector 51. The magnetic-pole position corrector 51 includes a λ-acquiring unit 61, a multiplier 62, an adder 63, an integrator 65, a PI controller 67, and an adder 69.

The estimate value $\hat{\theta}_r$ of the magnetic-pole position output from the magnetic-pole position estimator 45, the d-axis current $I_d$ and the q-axis current $I_q$ output from the d-q converter 33, and the d-axis current high-frequency component $I_{dh}$ and the q-axis current high-frequency component $I_{qh}$ output from the bandpass filter 53 are input to the magnetic-pole position corrector 51. The d-axis current and the q-axis current may be input from the notch filter 35 also.

Figure 4:
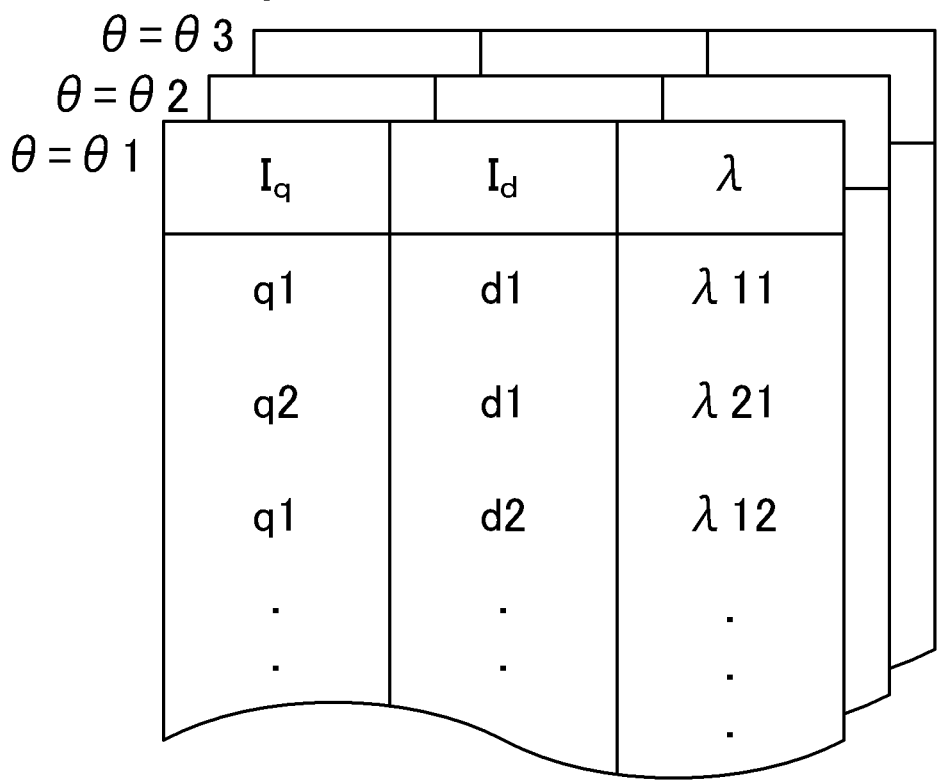
FIG. 4 is a diagram illustrating a content example of a control map.

The λ-acquiring unit 61 acquires the parameter λ relating to the correction amount corresponding to the estimate value $\hat{\theta}_r$ of the magnetic-pole position, the d-axis current $I_d$, and the q-axis current $I_q$, from the control map. The control map is a four-dimensional map in which the magnetic-pole position θ, the d-axis current $I_d$, and the q-axis current $I_q$, and the parameter λ relating to the correction amount are associated with each other (see FIG. 4).

The acquisition of the parameter λ is not limited to the mode in which the control map is retained. Information of mathematical formulae for calculating the parameter λ relating to the correction amount from the magnetic-pole position θ, the d-axis current $I_d$, and the q-axis current $I_q$ may be retained instead.

The multiplier 62 multiplies the parameter λ output from the λ-acquiring unit 61 by the d-axis current high-frequency component $I_{dh}$, and then outputs $\lambda I_{dh}$ obtained by the multiplication to the adder 63.

The adder 63 adds $\lambda I_{dh}$ output from the multiplier 62 to the q-axis current high-frequency component $I_{qh}$, and then outputs $I_{qh}+\lambda I_{dh}$ obtained by the addition to the integrator 65.

The integrator 65 integrates $I_{qh}+\lambda I_{dh}$ output from the adder 63, and then outputs the thus obtained integrated value of $I_{qh}+\lambda I_{dh}$ to the PI controller 67. The integrator 65 is a block provided to stabilize the control, and is not indispensable.

The PI controller 67 performs PI control so that the integrated value of $I_{qh}+\lambda I_{dh}$, which is output from the integrator 65, approaches zero, and then outputs a correction amount obtained by the PI control to the adder 69. The control is not limited to the PI control, and may also be control for increasing or decreasing a predetermined value in accordance with a positive/negative sign of the integrated value.

The adder 69 adds the estimate value $\hat{\theta}_r$ of the magnetic-pole position to the correction amount output from the PI controller 67, and then outputs the correction value $\hat{\theta}_a$ of the magnetic-pole position obtained by the addition.

The correction amount output from the PI controller 67 is not completely identical with the error Δθ (see FIG. 2) contained in the estimate value $\hat{\theta}_r$ of the magnetic-pole position as described later. However, because $I_{qh}+\lambda I_{dh}$ is made to approach zero, the correction amount is approximated to the error Δθ to the extent that the correction amount and the error Δθ become approximately the same.

The reason why $I_{qh}+\lambda I_{dh}$ is made to approach zero and the details of the parameter $\lambda$ relating to the correction amount are described with mathematical formulae.

In the following description of the mathematical formulae, the superscript "e" follows $V_d$, $V_q$, $I_d$, $I_q$, $I_{dh}$, $I_{qh}$, and $\theta_r$ relating to the estimated d- and q-axes, clearly marking them as different from those relating to actual d- and q-axes.

A voltage equation on the d- and q-axes in consideration of the d- and q-axes mutual interference is expressed by Mathematical Formula 2.

$$\begin{bmatrix} V_d \\ V_q \end{bmatrix} = \begin{bmatrix} R_s + L_{dh}p & -\omega_r L_q + L_{dqh}p \\ \omega_r L_d + L_{qdh}p & R_s + L_{qh}p \end{bmatrix} \begin{bmatrix} I_d \\ I_q \end{bmatrix} + \begin{bmatrix} 0 \\ \omega_r \Phi_m \end{bmatrix} \quad [\text{Math. 2}]$$

In Mathematical Formula 2, $R_s$ is a phase resistance of a winding of a stator, $\Phi_m$ is an interlinkage magnetic flux for one phase, which is generated by a permanent magnet, $\omega_r$ is a rotation speed, p is a differential operator, $V_d$ is the d-axis voltage, $V_q$ is the q-axis voltage, $I_d$ is the d-axis current, $I_q$ is the q-axis current, $L_d$ is a d-axis self-inductance, and $L_q$ is a q-axis self-inductance.

In addition, $L_{dh}$ is a d-axis high-frequency inductance, $L_{qh}$ is a q-axis high-frequency inductance, $L_{dqh}$ is a high-frequency inductance due to interference of the d-axis with the q-axis, and $L_{qdh}$ is a high-frequency inductance due to interference of the q-axis with the d-axis. The inductances $L_{dh}$, $L_{qh}$, $L_{dqh}$, and $L_{qdh}$ are expressed by Mathematical Formulae 3.

$$L_{dh} = \frac{\Psi_d(I_d + \Delta I_d, I_q, \Phi_m) - \Psi_d(I_d, I_q, \Phi_m)}{\Delta I_d} \quad [\text{Math. 3}]$$

$$L_{qh} = \frac{\Psi_q(I_d, I_q + \Delta I_q, \Phi_m) - \Psi_q(I_d, I_q, \Phi_m)}{\Delta I_q}$$

$$L_{dqh} = \frac{\Psi_d(I_d, I_q + \Delta i_q, \Phi_m) - \Psi_d(I_d, I_q, \Phi_m)}{\Delta I_q}$$

$$L_{qdh} = \frac{\Psi_q(I_d + \Delta I_d, I_q, \Phi_m) - \Psi_q(I_d, I_q, \Phi_m)}{\Delta I_d}$$

In Mathematical Formulae 3, $\Psi_d$ is a magnetic flux of the d-axis and $\Psi_q$ is a magnetic flux of the q-axis (magnetic fluxes obtained by converting the interlinkage magnetic fluxes of the U-, V-, and W-phases into those of the rotating d-q coordinate system). As expressed by Mathematical Formulae 3, $L_{dh}$, $L_{qh}$, $L_{dqhf}$ and $L_{qdh}$ depend on both $I_d$ and $I_q$ due to magnetic saturation by the currents $I_d$ and $I_q$.

When only the high-frequency component is extracted to analyze the error $\Delta\theta$ due to the high-frequency signal (error generated by the d- and q-axes mutual interference), Mathematical Formula 2 can be approximated by Mathematical Formula 4.

$$\begin{bmatrix} V_{dh} \\ V_{qh} \end{bmatrix} = \begin{bmatrix} L_{dh} & L_{dqh} \\ L_{qdh} & L_{qh} \end{bmatrix} p \begin{bmatrix} I_{dh} \\ I_{qh} \end{bmatrix} \quad [\text{Math. 4}]$$

Here, a rotation matrix T of Mathematical Formula 5 is defined to convert the voltage equation of the d-q axis coordinate system of Mathematical Formula 4 into that of the estimated d-q axis coordinate system, and Mathematical Formula 6 is obtained.

$$T(\Delta\theta) = \begin{bmatrix} \cos(\Delta\theta) & \sin(\Delta\theta) \\ -\sin(\Delta\theta) & \cos(\Delta\theta) \end{bmatrix} \quad [\text{Math. 5}]$$

Here, $\theta_r^e$ is an estimated phase (estimate value of the magnetic-pole position), $\theta_r$ is a true phase (actual magnetic-pole position), and the error $\Delta\theta$ is $\theta_r^e - \theta_r$ (see FIG. 2).

$$\begin{bmatrix} V_{dh}^e \\ V_{qh}^e \end{bmatrix} = T(\Delta\theta) \begin{bmatrix} V_{dh} \\ V_{qh} \end{bmatrix} \quad [\text{Math. 6}]$$

$$= \begin{bmatrix} L_{avg} - L_{dif}^* \cos(2\Delta\theta + \theta_m) & L_{dif}^* \sin(2\Delta\theta + \theta_m) - L_{dif}^* \\ L_{dif}^* \sin(2\Delta\theta + \theta_m) + L_{dif}^* & L_{avg} + L_{dif}^* \cos(2\Delta\theta + \theta_m) \end{bmatrix}$$

$$p \begin{bmatrix} I_{dh}^e \\ I_{qh}^e \end{bmatrix}$$

Figure 5:
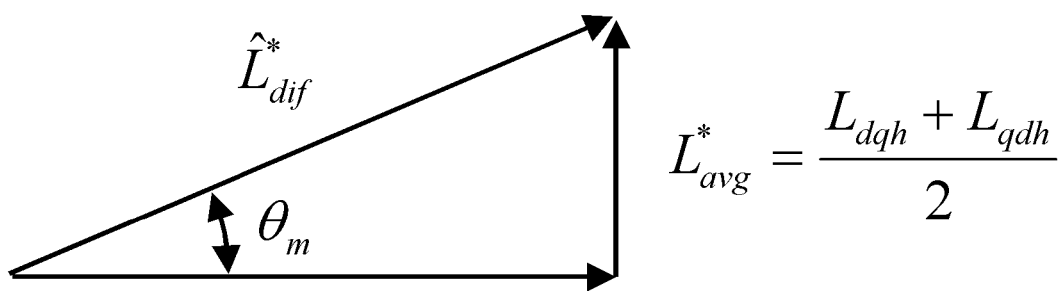
FIG. 5 is a diagram illustrating a relationship between high-frequency inductances.

Here, $L_{avg}$, $L_{dif}$, $\theta_m$, and the like contained in Mathematical Formula 6 are expressed by Mathematical Formulae 7. The relationship between $L_{avg}$, $L_{dif}$, $\theta_m$, and the like is shown in FIG. 5.

$$L_{avg} = \frac{L_{qh} + L_{dh}}{2} \quad [\text{Math. 7}]$$

$$L_{dif} = \frac{L_{qh} - L_{dh}}{2}$$

$$\theta_m = \tan^{-1} \frac{L_{avg}^*}{L_{dif}^*} = \tan^{-1}\left(\frac{L_{dqh} + L_{qdh}}{L_{qh} - L_{dh}}\right)$$

$$L_{dif}^* = \sqrt{L_{dif}^2 + L_{avg}^{*2}}$$

$$L_{avg}^* = \frac{L_{dqh} + L_{qdh}}{2}$$

$$L_{dif}^* = \frac{L_{qdh} + L_{dqh}}{2}$$

In Mathematical Formulae 7, $\theta_m$ is a phase shift due to the presence of the d- and q-axes mutual interference. While Mathematical Formula 6 is as shown above, the voltage equation when the high-frequency voltage $V_{sig}$ is applied to the estimated d-axis is expressed by Mathematical Formula 8.

$$\begin{bmatrix} V_{sig} \\ 0 \end{bmatrix} = \begin{bmatrix} L_{avg} - L_{dif}^* \cos(2\Delta\theta + \theta_m) & L_{dif}^* \sin(2\Delta\theta + \theta_m) - L_{dif}^* \\ L_{dif}^* \sin(2\Delta\theta + \theta_m) + L_{dif}^* & L_{avg} + L_{dif}^* \cos(2\Delta\theta + \theta_m) \end{bmatrix} \quad [\text{Math. 8}]$$

$$p \begin{bmatrix} I_{dh}^e \\ I_{qh}^e \end{bmatrix}$$

By simplifying Mathematical Formula 8 for the current, Mathematical Formula 9 is obtained.

$$p \begin{bmatrix} I_{dh}^e \\ I_{qh}^e \end{bmatrix} = \begin{bmatrix} L_{avg} - L_{dif}^* \cos(2\Delta\theta + \theta_m) & L_{dif}^* \sin(2\Delta\theta + \theta_m) - L_{dif}^* \\ L_{dif}^* \sin(2\Delta\theta + \theta_m) + L_{dif}^* & L_{avg} + L_{dif}^* \cos(2\Delta\theta + \theta_m) \end{bmatrix}^{-1} \begin{bmatrix} V_{sig} \\ 0 \end{bmatrix} \quad [\text{Math. 9}]$$

$$= \frac{V_{sig}}{L_{avg}^2 - L_{dif}^{*2} + L_{dif}^{*2}} \begin{bmatrix} L_{avg} + L_{dif}^* \cos(2\Delta\theta + \theta_m) \\ -L_{dif}^* \sin(2\Delta\theta + \theta_m) - L_{dif}^* \end{bmatrix}$$

By integrating both sides of Mathematical Formula 9, Mathematical Formulae 10 are obtained as high-frequency currents of the estimated d- and q-axes.

$$I_{dh}^e = \frac{V_{sig}}{p(L_{avg}^2 - L_{dif}^{*2} + L_{dif}^{*2})}\{L_{avg} + L_{dif}^*\cos(2\Delta\theta + \theta_m)\} \quad \text{[Math. 10]}$$

$$I_{qh}^e = \frac{-V_{sig}}{p(L_{avg}^2 - L_{dif}^{*2} + L_{dif}^{*2})}\{L_{dif}^*\sin(2\Delta\theta + \theta_m) + L_{dif}^*\}$$

Here, when the control is performed so that $I_{qh}^e = 0$ is satisfied, that is, when the high-frequency voltage is applied only to the estimated d-axis, Mathematical Formula 11 is obtained.

$$I_{qh}^e = \frac{-V_{sig}}{p(L_{avg}^2 - L_{dif}^{*2} + L_{dif}^{*2})}\{L_{dif}^*\sin(2\Delta\theta + \theta_m) + L_{dif}^*\} = 0 \quad \text{[Math. 11]}$$

Deduced from Mathematical Formula 11, the error $\Delta\theta$ generated due to the d- and q-axes mutual interference is expressed by Mathematical Formula 12.

$$\Delta\theta = \frac{1}{2}\sin^{-1}\left(-\frac{L_{dif}^*}{L_{dif}^*}\right) - \frac{1}{2}\tan^{-1}\left(\frac{L_{dqh} + L_{qdh}}{L_{qh} - L_{dh}}\right) \quad \text{[Math. 12]}$$

Further, for a motor in practical use, it can be considered that $L_{dqh}$ and $L_{qdh}$ are approximately equal to each other. Therefore, Mathematical Formula 13 is obtained.

$$\Delta\theta = -\frac{1}{2}\tan^{-1}\left(\frac{2L_{dqh}}{L_{qh} - L_{dh}}\right) \quad \text{[Math. 13]}$$

According to Mathematical Formula 13, when there is no d- and q-axes mutual interference ($L_{dqh} = L_{qdh} = 0$), the error $\Delta\theta$ becomes zero.

Here, it is conceivable to perform control by using the error $\Delta\theta$ in Mathematical Formula 12 as the correction amount. In such a case, however, the control becomes non-linear control, and therefore is difficult to perform. In consideration of performing the correction which is started at a point at which $\theta_r^e$ starts slightly shifting from $\theta_r$ (at a point at which $\Delta\theta$ is approximately zero), the control can be linearized, supposing that the error $\Delta\theta$ is approximately zero.

Therefore, supposing that $\Delta\theta$ is approximately zero, cos ($\Delta\theta$) can be approximated as 1 and sin ($\Delta\theta$) can be approximated as $\Delta\theta$. Thus, Mathematical Formulae 14 are obtained.

$$\cos(\Delta\theta) \approx 1, \sin(\Delta\theta) \approx \Delta\theta$$

$$\cos(2\Delta\theta + \theta_m) \approx \cos(\theta_m) - 2\Delta\theta \cdot \sin(\theta_m)$$

$$\sin(2\Delta\theta + \theta_m) \approx 2\Delta\theta \cdot \cos(\theta_m) + \sin(\theta_m) \quad \text{[Math. 14]}$$

As a result, $I_{dh}^e$ and $I_{qh}^e$ in Mathematical Formulae 10 are approximated as expressed by Mathematical Formulae 15.

$$I_{dh}^e = \frac{V_{sig}}{p(L_{avg}^2 - L_{dif}^{*2} + L_{dif}^{*2})}\{L_{avg} + L_{dif}^*\cos(2\Delta\theta + \theta_m)\} \quad \text{[Math. 15]}$$

$$= \frac{V_{sig}}{p(L_{avg}^2 - L_{dif}^{*2} + L_{dif}^{*2})}(L_{qh} - 2L_{avg}^* \cdot \Delta\theta)$$

$$I_{qh}^e = \frac{-V_{sig}}{p(L_{avg}^2 - L_{dif}^{*2} + L_{dif}^{*2})}\{L_{dif}^*\sin(2\Delta\theta + \theta_m) + L_{dif}^*\}$$

$$= \frac{V_{sig}}{p(L_{avg}^2 - L_{dif}^{*2} + L_{dif}^{*2})}(L_{dqh} - 2L_{dif} \cdot \Delta\theta)$$

Here, it is defined that $\lambda = L_{dqh}/L_{qh}$, and then Mathematical Formula 16 is obtained from Mathematical Formulae 15.

$$I_{qh}^e + \lambda I_{dh}^e = \frac{V_{sig}}{p(L_{avg}^2 - L_{dif}^{*2} + L_{dif}^{*2})}(-2L_{dif} - 2\lambda L_{avg}^*) \cdot \Delta\theta \quad \text{[Math. 16]}$$

Then, deduced from this Mathematical Formula 16, $\Delta\theta$ is given by Mathematical Formulae 17.

$$\Delta\theta = \frac{(L_{avg}^2 - L_{dif}^{*2} + L_{dif}^{*2})p(I_{qh}^e + \lambda I_{dh}^e)}{-2V_{sig}(L_{dif} - \lambda L_{avg}^*)} \quad \text{[Math. 17]}$$

$$= k_{HF}^{\Delta\theta}(I_{qh}^e + \lambda I_{dh}^e)$$

$$k_{HF}^{\Delta\theta} = -\frac{L_{avg}^2 - L_{dif}^{*2} + L_{dif}^{*2}}{2V_{sig}(L_{dif} - \lambda L_{avg}^*)}p$$

As described above, when the control is performed so as to satisfy: $I_{qh}^e + \lambda I_{dh}^e = 0$, the error $\Delta\theta$ becomes zero. The positions of the actual d- and q-axes are unknown at the time of the control, and therefore it is obvious that $I_{qh}^e$ and $I_{dh}^e$ are currents on the estimated d- and q-axes. Thus, the superscript "e" is omitted from $I_{qh}^e$ and $I_{dh}^e$ in the following description.

However, the differential operator p is contained in $\hat{k}_{HF}^{\Delta\theta}$ in Mathematical Formulae 17, and hence there is a fear that the value of $I_{qh} + \lambda I_{dh}$ may oscillate to make the control difficult. Therefore, it is preferred to perform the control so that the integrated value of $I_{qh} + \lambda I_{dh}$ becomes zero.

As to the inductances contained in the above-mentioned value $\hat{k}_{HF}^{\Delta\theta}$, the relationships: $L_{avg} > \hat{L}_{dif^*}$, $L_{dif} > 0$ and $L_{avg}^* > 0$ are satisfied. Therefore, the parts of above-mentioned $\hat{k}_{HF}^{\Delta\theta}$ except for the differential operator p become always negative. Therefore, when the integrated value of $I_{qh} + \lambda I_{dh}$ is positive, the error $\Delta\theta$ is negative. On the other hand, when the integrated value of $I_{qh} + \lambda I_{dh}$ is negative, the error $\Delta\theta$ is positive. Thus, the PI feedback control can be applied, considering the integrated value of $I_{qh} + \lambda I_{dh}$ as a deviation.

Figure 6:
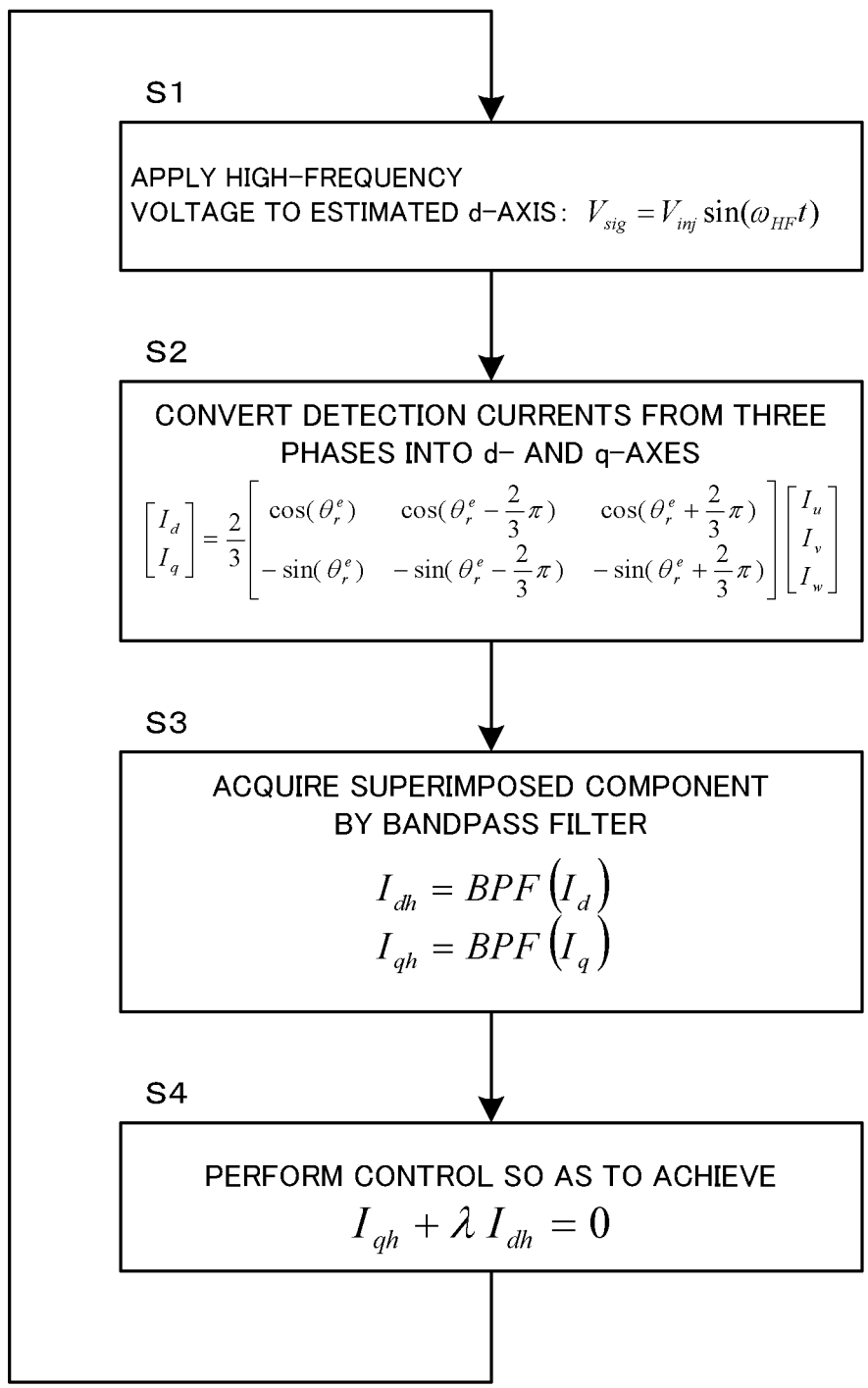
FIG. 6 is a flowchart illustrating an operation example of the motor controller.
Figure 7A:
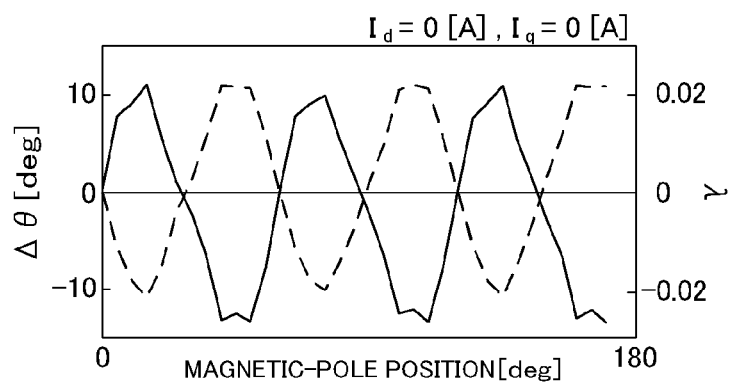
FIG. 7A is a graph showing a relationship between $\Delta\theta$ and $\lambda$ corresponding to a magnetic-pole position when $I_d=0$ [A] and $I_q=0$ [A].
Figure 7B:
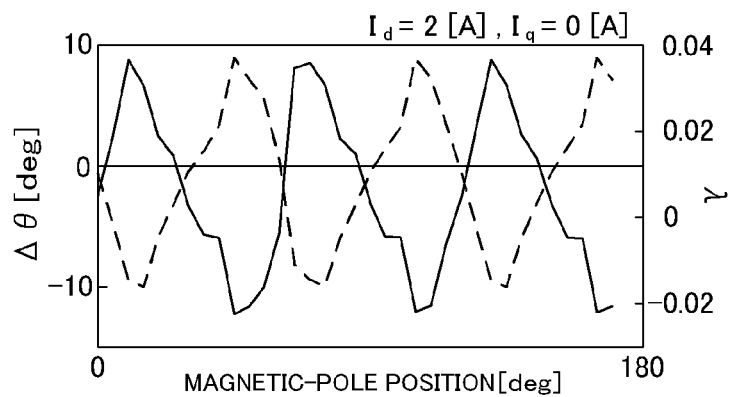
FIG. 7B is a graph showing a relationship between $\Delta\theta$ and $\lambda$ corresponding to the magnetic-pole position when $I_d=2$ [A] and $I_q=0$ [A].
Figure 7C:
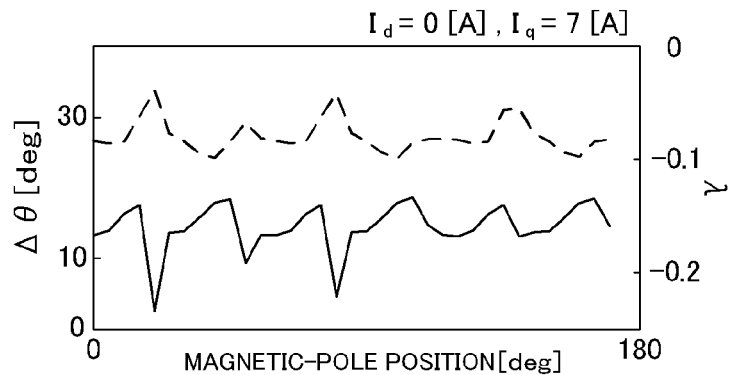
FIG. 7C is a graph showing a relationship between $\Delta\theta$ and $\lambda$ corresponding to the magnetic-pole position when $I_d=0$ [A] and $I_q=7$ [A].
Figure 7D:
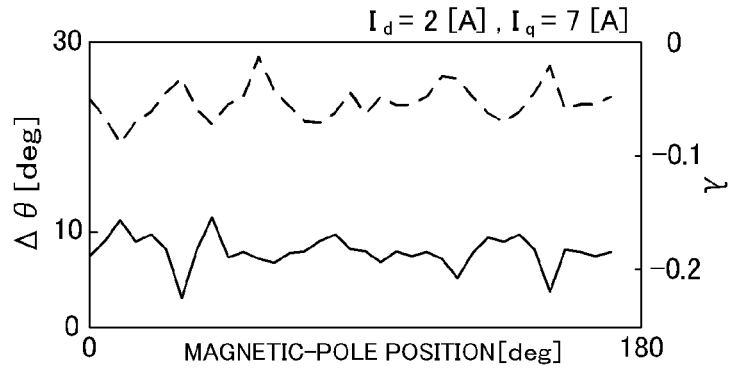
FIG. 7D is a graph showing a relationship between $\Delta\theta$ and $\lambda$ corresponding to the magnetic-pole position when $I_d=2$ [A] and $I_q=7$ [A].

FIG. 6 is a flowchart illustrating an operation example of the motor controller 1. FIG. 6 illustrates an operation for correcting the estimate value of the magnetic-pole position among various operations realized by the motor controller 1.

In Step S1, the motor controller 1 applies the high-frequency voltage $V_{sig}$ to the estimated d-axis. This operation is realized by the high-frequency superimposer 41 illustrated in FIG. 1.

In Step S2, the motor controller 1 convers the current detection values detected from the motor 9 from those of the three phases into those of the d-q axes. This operation is realized by the three-to-two phase converter 31 and the d-q converter 33 illustrated in FIG. 1.

In Step S3, the motor controller 1 acquires a superimposed component from the current detection values obtained by the conversion through the bandpass filter. This operation is realized by the bandpass filter 53 illustrated in FIG. 1.

In Step S4, the motor controller 1 performs the control so that $I_{qh} + \lambda I_{dh}$ becomes zero. This operation is realized by the magnetic-pole position corrector 51 illustrated in FIGS. 1 and 3.

FIGS. 7A to 7D are graphs each showing a relationship between Δθ and λ corresponding to the magnetic-pole position. The horizontal axis indicates the magnetic-pole position, whereas the vertical axis indicates the error Δθ (axial shift) and the parameter λ ($=L_{dqh}/L_{qh}$) relating to the correction amount. The error Δθ is indicated by the broken line, whereas the parameter λ is indicated by the solid line.

As shown in FIGS. 7A to 7D, a change of the parameter λ in accordance with the magnetic-pole position corresponds to a change of the error Δθ in accordance with the magnetic-pole position. Therefore, the correction amount for the error Δθ corresponding to the magnetic-pole position can be generated by using the parameter λ.

The fact that the error Δθ changes depending on the magnetic-pole position is caused by the fact that the high-frequency inductances $L_{dqh}$ and $L_{qh}$ contained in the parameter λ changes depending on the magnetic-pole position. This is especially true in a concentrated-winding motor among various motors. Therefore, the correction of the estimate value of the magnetic-pole position in this embodiment is suitable for the case where the concentrated-winding motor is to be controlled.

A steady magnitude of the error Δθ depends on magnitudes of the d-axis current $I_d$ and the q-axis current $I_q$. Specifically, the error Δθ contains an oscillating component depending on the magnetic-pole position and a steady component depending on the magnitude of the current. Therefore, by using the parameter λ corresponding not only to the magnetic-pole position but also to the d-axis current $I_d$ and the q-axis current $I_q$, both of the components can be suppressed.

Now, a method of creating the control map is described.

First Example

A first example of the method of creating the control map is a method of calculating the parameter λ relating to the correction amount by using magnetic-field analysis.

The parameter $\lambda(=L_{dqh}/L_{qh})$ relating to the correction amount is calculated based on, for example, the d-axis interlinkage magnetic flux $\Psi_d$ due to the d-axis current $I_d$, the q-axis interlinkage magnetic flux $\Psi_q$ due to the q-axis current $I_q$, the interlinkage magnetic flux $\Phi_m$ due to the magnet included in the motor 9, the d-axis current high-frequency component $I_{dh}$, and the q-axis current high-frequency component $I_{qh}$. The parameter λ is calculated for each of the case where the magnetic-pole position θ is changed, the case where the d-axis current $I_d$ is changed, and the case where the q-axis current $I_q$ is changed.

A specific description is now given. First, the d-axis interlinkage magnetic flux $\Psi_d$ due to the d-axis current $I_d$ and the q-axis interlinkage magnetic flux $\Psi_q$ due to the q-axis current $I_q$ are calculated. For example, three-phase interlinkage magnetic fluxes $\Psi_u$, $\Psi_v$, and $\Psi_w$ are calculated from the three-phase currents $I_u$, $I_v$, and $I_w$, and are further converted into the currents on the d- and q-axes. In this manner, the d-axis interlinkage magnetic flux $\Psi_d$ and the q-axis interlinkage magnetic flux $\Psi_q$ are calculated. The interlinkage magnetic flux $\Phi_m$ due to the magnet included in the motor 9 has an approximately constant value.

Next, by substituting $\Delta I_d$ and $\Delta I_q$ for the d-axis current high-frequency component $I_{dh}$ and the q-axis current high-frequency component $I_{qh}$, which are high-frequency components appearing in the current when a high-frequency voltage (for example, 8 kHz and 40 V) is superimposed on the voltage applied to the motor 9, the high-frequency inductances $L_{dh}$, $L_{qh}$, $L_{dqh}$, and $L_{qdh}$ are calculated from Mathematical Formulae 3. In this manner, the parameter $\lambda(=L_{dqh}/L_{qh})$ is calculated.

The parameter λ depends on the magnetic-pole position θ, the d-axis current $I_d$, and the q-axis current $I_q$. The parameter λ is calculated by changing each of the three parameters (on which the parameter λ depends) independently by a certain fixed amount. An interval to change the magnetic-pole position θ can be, for example, 5 degrees of an electric angle. An interval to change the d-axis current $I_d$ and the q-axis current $I_q$ can be, for example, $1/10^{th}$ to $1/5^{th}$ of their respective maximum magnitude. Then, the calculated values are associated with each other on the control map.

Second Example

A second example of the method of creating the control map is a method of calculating the parameter λ relating to the correction amount by using actually measured values.

Figure 8:
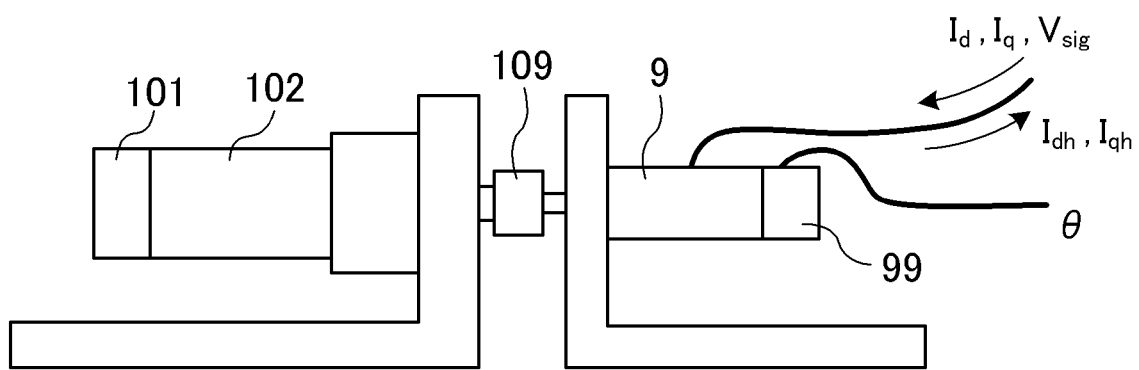
FIG. 8 is a diagram illustrating a method of creating a control map with an actual measurement.

The parameter $\lambda(=L_{dqh}/L_{qh})$ relating to the correction amount is calculated based on the d-axis current high-frequency component $I_{dh}$ and the q-axis current high-frequency component $I_{qh}$ appearing in the current flowing through the motor 9 when the high-frequency voltage $V_{sig}$ is superimposed on the voltage applied to the motor 9 with an encoder 99 mounted thereon as illustrated in FIG. 8, for example. The parameter λ is calculated for each of the case where the magnetic-pole position θ is changed, the case where the d-axis current $I_d$ is changed, and the case where the q-axis current $I_q$ is changed.

A specific description is now given. When the high-frequency voltage $V_{sig}$ is applied only to the d-axis in Mathematical Formula 4, Mathematical Formula 18 is obtained.

$$\begin{bmatrix} V_{sig} \\ 0 \end{bmatrix} = \begin{bmatrix} L_{dh} & L_{dqh} \\ L_{dqh} & L_{qh} \end{bmatrix} = \begin{bmatrix} I_{dh} \\ I_{qh} \end{bmatrix} \qquad \text{[Math. 18]}$$

The d-axis current high-frequency component $I_{dh}$ and the q-axis current high-frequency component $I_{qh}$ in this case are expressed by Mathematical Formulae 19 based on Mathematical Formulae 15.

$$I_{dh} = \frac{V_{sig}}{p(L_{avg}^2 - L_{dif}^2)} L_{qh} \qquad \text{[Math. 19]}$$

$$I_{qh} = \frac{V_{sig}}{p(L_{avg}^2 - L_{dif}^2)} L_{dqh}$$

Deduced from these Mathematical Formulae 19, the parameter $\lambda(=L_{dqh}/L_{qh})$ is expressed by the following Mathematical Formula 20.

$$\lambda = \frac{L_{dqh}}{L_{qh}} = -\frac{I_{qh}}{I_{dh}} \qquad \text{[Math. 20]}$$

Therefore, when the d-axis current high-frequency component $I_{dh}$ and the q-axis current high-frequency component $I_{qh}$ are measured in a state in which the magnetic-pole position θ can be detected, the parameter λ can be calculated.

The d-axis current high-frequency component $I_{dh}$ and the q-axis current high-frequency component $I_{qh}$ are measured in a state in which the encoder 99 is mounted to the motor 9 so that the magnetic-pole position θ is detectable, as illustrated in FIG. 8. A shaft of the motor 9 is coupled to a shaft of another motor 102 through an intermediation of a shaft connecting portion 109. The motor 102 and an encoder 101 are provided to fix the shaft of the motor 9 so as to prevent the shaft of the motor 9 from rotating.

Then, the high-frequency voltage $V_{sig}$ is applied to the motor 9 in a state in which the predetermined magnetic-pole position θ, d-axis current $I_d$, and q-axis current $I_q$ are given. The d-axis current high-frequency component $I_{dh}$ and the q-axis current high-frequency component $I_{qh}$ are measured. Thereafter, the parameter ($=L_{dqh}/L_{qh}=-I_{qh}/I_{dh}$) is calculated.

As in the first example described above, the parameter λ is calculated by changing each of the three parameters (on which the parameter λ depends) independently by a certain fixed amount. An interval to change the magnetic-pole position θ can be, for example, 5 degrees of an electric angle. An interval to change the d-axis current $I_d$ and the q-axis current $I_q$ can be, for example, $1/5^{th}$ to $1/10^{th}$ of their respective maximum magnitude. Then, the calculated values are associated with each other on the control map.

It should be understood by those skilled in the art that various modifications, combinations, sub-combinations and alterations may occur depending on design requirements and other factors insofar as they are within the scope of the appended claims or the equivalents thereof.

What is claimed is:

1. A rotary electric machine controller, comprising:
   a superimposer for superimposing a high-frequency signal on one of a voltage and a current of a rotary electric machine having saliency;
   an estimator for calculating an estimate value of a magnetic-pole position of a rotor included in the rotary electric machine based on a high-frequency component appearing in the other one of the voltage and the current of the rotary electric machine;
   a retainer for retaining correction amount relating values which are different from each other for at least two points of the magnetic-pole position of the rotor; and
   a corrector for acquiring one of the correction amount relating values retained by the retainer corresponding to the estimate value of the magnetic-pole position of the rotor and correcting the estimate value of the magnetic-pole position of the rotor based on the acquired one of the correction amount relating values.

2. The rotary electric machine controller according to claim 1, wherein:
   the retainer retains the correction amount relating values associated with respective points of a torque current (q-axis current), respective points of a field current (d-axis current), and respective points of the magnetic-pole position of the rotor of the rotary electric machine; and
   the corrector acquires the one of the correction amount relating values corresponding to a detected value of the torque current, a detected value of the field current, and the estimate value of the magnetic-pole position of the rotor.

3. The rotary electric machine controller according to claim 1, wherein the correction amount relating values contains a high-frequency inductance due to d- and q-axes mutual interference, which changes in accordance with the magnetic-pole position of the rotor.

4. The rotary electric machine controller according to claim 1, wherein the corrector corrects the estimate value of the magnetic-pole position of the rotor so that D expressed by Mathematical Formula (1) approaches zero,

[Math. 1]

$$D = I_{qh}^e + \lambda I_{dh}^e \quad (1)$$

$$\lambda = \frac{L_{dqh}}{L_{qh}} \quad (2)$$

where λ is the one of the correction amount relating values and is a variable expressed by Mathematical Formula (2), $I_{dh}^e$ is a high-frequency component of an estimated d-axis current, $I_{qh}^e$ is a high-frequency component of an estimated q-axis current, $L_{dqh}$ is a high-frequency inductance due to d- and q-axes mutual interference, and $L_{qh}$ is a high-frequency inductance of a q-axis.

5. The rotary electric machine controller according to claim 4, wherein the corrector corrects the estimate value of the magnetic-pole position of the rotor so that an integrated value of the D approaches zero.

6. The rotary electric machine controller according to claim 1, wherein the correction amount relating values are generated and retained for each of at least two points of the magnetic-pole position of the rotor based on a d-axis interlinkage magnetic flux due to a d-axis current, a q-axis interlinkage magnetic flux due to a q-axis current, an interlinkage magnetic flux due to a magnet included in the rotary electric machine, a high-frequency component of the d-axis current, and a high-frequency component of the q-axis current.

7. The rotary electric machine controller according to claim 1, wherein the correction amount relating values are generated and retained for each of at least two points of the magnetic-pole position of the rotor based on the high-frequency component appearing in the other one of the voltage and the current of the rotary electric machine provided with a magnetic-pole position detector when the high-frequency signal is superimposed on the one of the voltage and the current.

8. The rotary electric machine controller according to claim 1, wherein the rotary electric machine comprises a concentrated-winding motor.

9. A rotary electric machine control method, which is executed on a microprocessor executing information processing in accordance with a program stored in memory, the method comprising:
   superimposing a high-frequency signal on one of a voltage and a current of a rotary electric machine having saliency;
   calculating an estimate value of a magnetic-pole position of a rotor included in the rotary electric machine based on a high-frequency component appearing in the other one of the voltage and the current of the rotary electric machine;
   retaining correction amount relating values which are different from each other for at least two points of the magnetic-pole position of the rotor; and
   acquiring one of the correction amount relating values retained corresponding to the estimate value of the magnetic-pole position of the rotor; and
   correcting the estimate value of the magnetic-pole position of the rotor based on the acquired one of the correction amount relating values.

10. A method of creating a control map to be retained in a rotary electric machine controller, which is executed on a microprocessor executing information processing accordance with in memory, the method comprising:
 generating, for each of at least two points of a magnetic-pole position of a rotor included in a rotary electric machine having saliency, correction amount relating values for correcting an estimate value of the magnetic-pole position of the rotor, correction amount relating values being calculated based on a high-frequency component appearing in one of a voltage and a current of the rotary electric machine when a high-frequency signal is superimposed on the other one of the voltage and the current; and
 associating, on the control map, the points of the magnetic-pole position of the rotor and the information relating to the correction amount relating values generated for each of the points with each other.

* * * * *